US009729033B2

(12) United States Patent
Caine

(10) Patent No.: US 9,729,033 B2
(45) Date of Patent: Aug. 8, 2017

(54) VARIABLE SPEED ELECTRO-MECHANICAL DRIVE

(71) Applicant: Ford Global Technologies, LLC, Dearborn, MI (US)

(72) Inventor: Jon Edward Caine, South Woodham Ferrers (GB)

(73) Assignee: Ford Global Technologies, LLC, Dearborn, MI (US)

( * ) Notice: Subject to any disclaimer, the term of this patent is extended or adjusted under 35 U.S.C. 154(b) by 256 days.

(21) Appl. No.: 14/526,363

(22) Filed: Oct. 28, 2014

(65) Prior Publication Data

US 2015/0130316 A1     May 14, 2015

(30) Foreign Application Priority Data

Nov. 14, 2013 (GB) .................................. 1320095.1

(51) Int. Cl.
     *H02K 16/00*      (2006.01)

(52) U.S. Cl.
     CPC ................. *H02K 16/005* (2013.01)

(58) Field of Classification Search
     CPC .................................................. H02K 16/005
     USPC ............................................. 318/494, 34, 94
     See application file for complete search history.

(56) References Cited

U.S. PATENT DOCUMENTS

| 5,200,659 A * | 4/1993 | Clarke ................... H02K 16/04 310/112 |
| 5,565,723 A | 10/1996 | Dastidar |
| 6,339,301 B1 * | 1/2002 | Wallingford ............. B60K 1/00 180/65.6 |
| 6,371,887 B1 | 4/2002 | Miller |
| 6,437,529 B1 * | 8/2002 | Brown ................... H02K 16/04 318/400.21 |
| 7,530,915 B2 | 5/2009 | Grimm |
| 8,248,006 B2 | 8/2012 | Klatt |
| 8,253,294 B1 | 8/2012 | Wishart |

FOREIGN PATENT DOCUMENTS

| CN | 2279744 Y | 4/1998 |
| CN | 101345468 A | 1/2009 |
| CN | 101873053 A | 10/2010 |
| CN | 102255474 A | 11/2011 |

(Continued)

OTHER PUBLICATIONS

Jones, W. D. et al., "Electric Drives on the LV100 Gas Turbine Engine," Transactions of the ASME, Journal of Engineering for Gas Turbines and Power, published Apr. 1994, vol. 116, pp. 411-417, 7 pages.

(Continued)

*Primary Examiner* — David S Luo
(74) *Attorney, Agent, or Firm* — Julia Voutyras; McCoy Russell LLP

(57) ABSTRACT

An electrical machine and method for driving at least one ancillary device of a motor is provided wherein the electrical machine comprises a stator, configured to be rotated, and a rotor, rotatably mounted relative to the stator, coupled to the ancillary device. The speed of the rotor may be a function of the rotational speed of the stator and the frequency of a supply current supplied to the electrical machine and thus drives the ancillary device at a demanded load/speed.

18 Claims, 5 Drawing Sheets

(56) References Cited

FOREIGN PATENT DOCUMENTS

EP          0556477 A1      8/1993
GB          1403349 A       8/1975

OTHER PUBLICATIONS

Takagishi, Hiroshi et al., Simulation of Accessory Drive Belt Concerning to Slippage and Transversal Vibration, Proceedings of ICES2006, ASME Internal Combustion Engine Division 2006 Spring Technical Conference, May 8-10, 2006, Aachen, Germany, pp. 701-708, 8 pages.

* cited by examiner

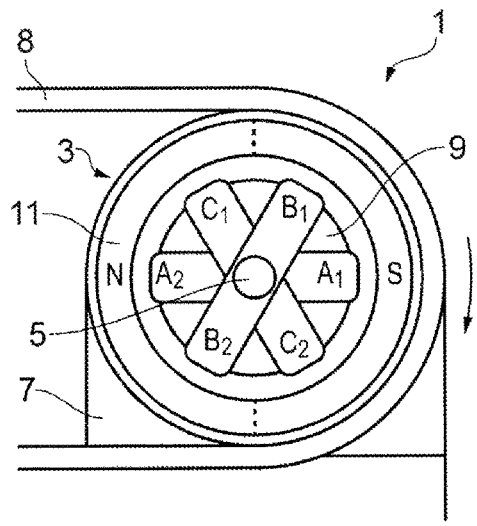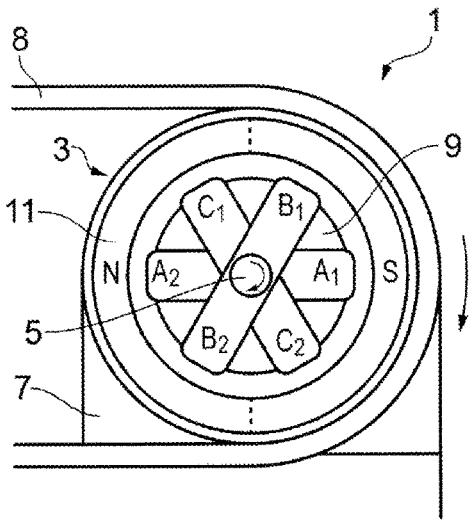
FIG. 2A  FIG. 2B
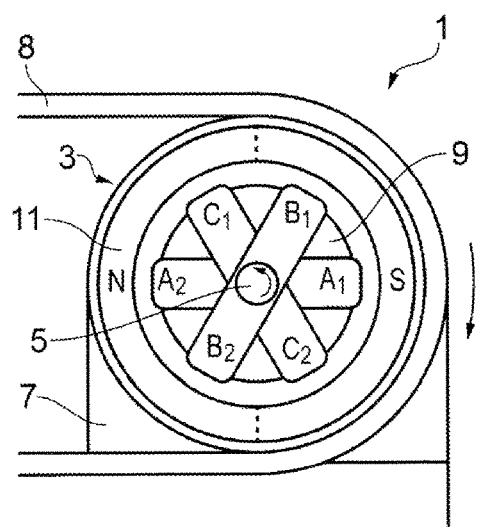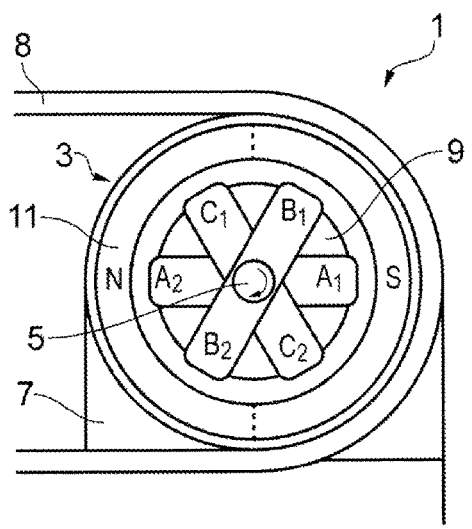
FIG. 2C  FIG. 2D

VARIABLE SPEED ELECTRO-MECHANICAL DRIVE

CROSS REFERENCE TO RELATED APPLICATIONS

The present application claims priority to GB Application No. 1320095.1, "VARIABLE SPEED ELECTRO-MECHANICAL DRIVE," filed Nov. 14, 2013, the entire contents of which are hereby incorporated by reference for all purposes.

FIELD

The present application relates to an electrical machine for driving one or more ancillary devices, and particularly, but not exclusively, relates to an electrical machine comprising a rotor and a stator, wherein the stator is configured to rotate and the rotational speed of the rotor depends upon a supply current to the electrical machine and a rotational speed of the stator.

BACKGROUND\SUMMARY

In an internal combustion engine, ancillary devices may be provided, such as water pumps, power steering, etc. The ancillary devices may be driven off the crankshaft at the same speed as the engine. Thus, the ancillary devices have a predetermined gearing in order to fulfill a maximum load. Further, the ancillaries may be driven faster than a load demand, which may result in reduced fuel economy for the engine.

Other attempts to address running ancillary devices include using one or more independent electric motors to drive the ancillary devices at variable speeds such that the ancillary device may operate at a speed appropriate to a load demand. Another attempt to address running ancillary devices include using a variable speed drive, such as a gearbox, that is driven mechanically by the output shaft of the main drive motor and is coupled to the ancillary device.

However, the inventors herein have recognized potential issues with such systems. In the first approach, the power to drive the ancillary devices using electric motors may result in losses due to the generation, storage, and motor cycle of the independent electric motors. In the second approach, standard gearboxes may provide discrete gear ratios and therefore be unable to provide a fully variable speed drive to the ancillary device.

One potential approach to at least partially address some of the above issues includes a system and method for an electrical machine for driving one or more ancillary devices of a motor. The electrical machine may comprise a stator, which is configured to be rotated, and a rotor, which is rotatably mounted relative to the stator. The rotational speed of the rotor of the electrical machine depends upon a supply current to the electrical machine and the rotational speed of the stator.

For example, an ancillary device, such as an alternator, may be driven at a lower speed when the load on the motor's starter battery system is low or at a higher speed when the load is high. In another example, a speed of the ancillary device of the coolant system of the motor may vary continuously depending on the motor operation and/or the ambient conditions.

In this way, the ancillary devices may be driven at speeds appropriate to the operating conditions of the motor. Thus, the ancillary devices being driven at appropriate speeds may improve fuel economy and/or improve motor performance.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

BRIEF DESCRIPTION OF THE DRAWINGS

FIG. 2A shows a radial cross section through the electrical machine with a rotor synchronised to the rotation of a stator.

FIG. 2B shows a radial cross section through the electrical machine with the rotor rotating in the same direction as the stator.

FIG. 2C shows a radial cross section through the electrical machine with the rotor rotating in the opposite direction as the stator.

FIG. 2D shows a radial cross section through the electrical machine with the stator not rotating and the rotor rotating.

DETAILED DESCRIPTION

Figure 4:
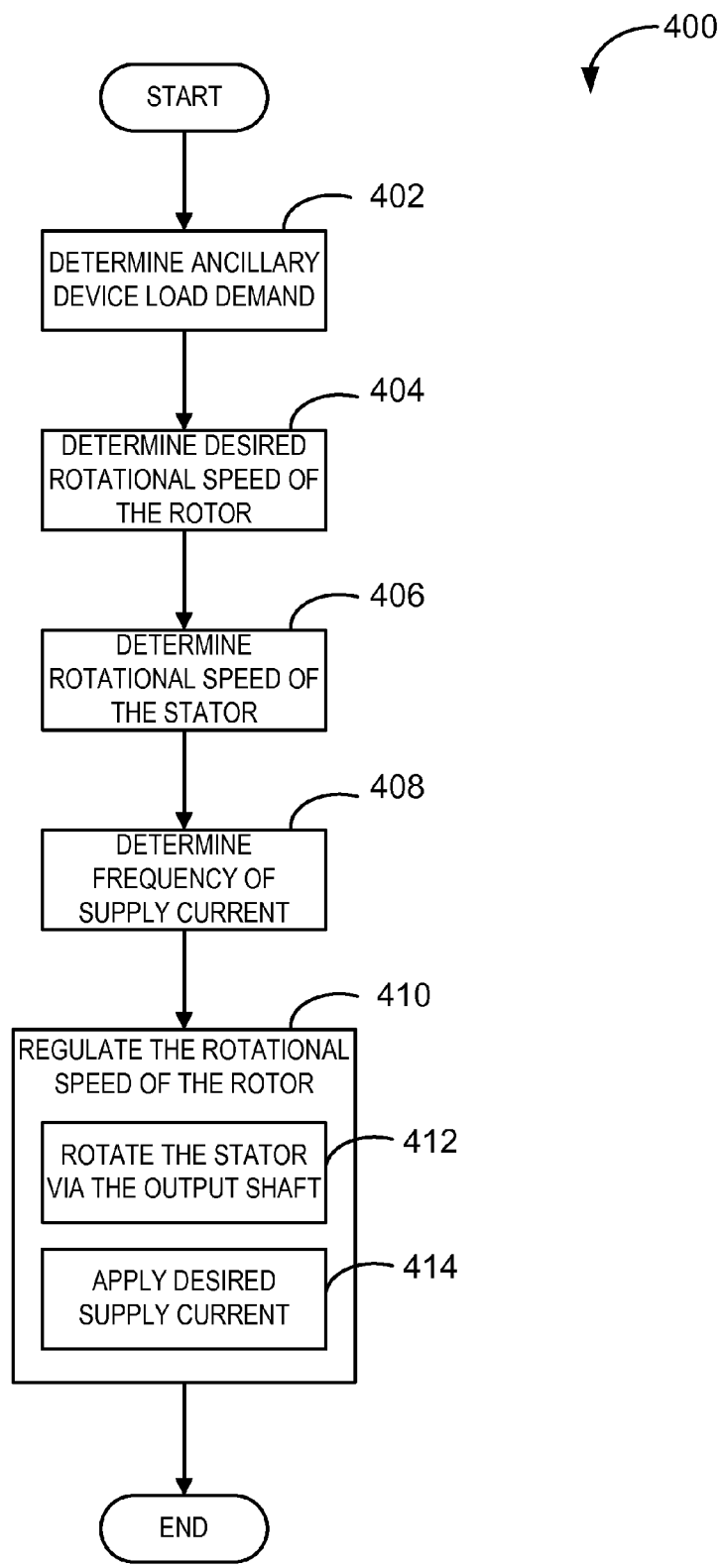
FIG. 4 shows an example method for operating the electrical machine.
Figure 5:
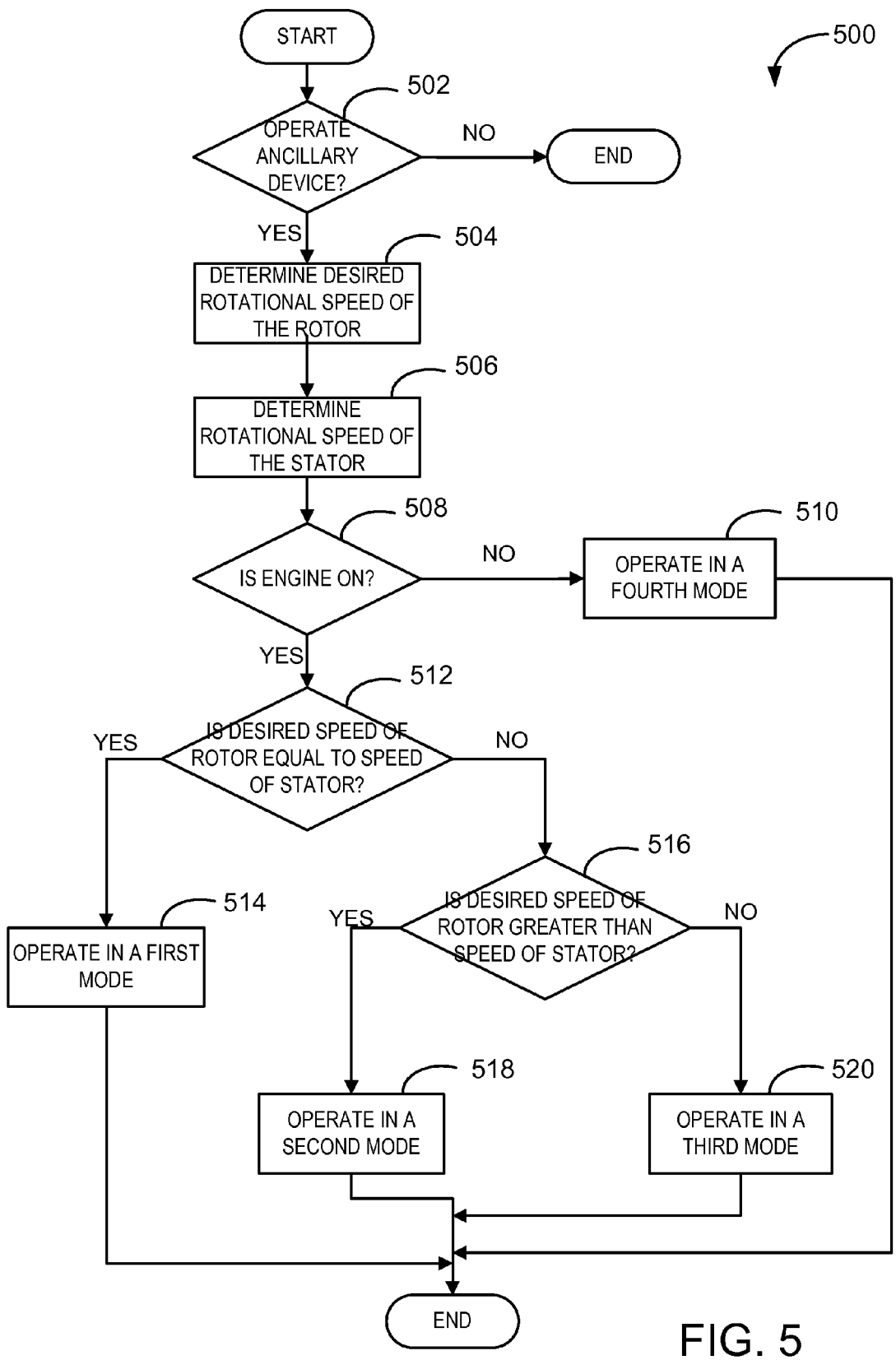
FIG. 5 shows an example method for choosing a mode of operation for the electrical machine.

The following description relates to systems and methods for an electrical machine for driving one or more ancillary devices on a vehicle. The electrical machine comprises a stator and a rotor, mounted relative to the stator, illustrated in FIGS. 1 and 3. The rotational speed of the rotor may be controlled by a supply current to the electrical machine and a rotational speed of the stator and thus drive one or more ancillary devices on a motor. The rotor may rotate about a common axis with the stator and may further rotate in the same or opposite direction as the stator, as illustrated in FIGS. 2A, 2B, 2C, and 2D. Example methods for driving one or more ancillary devices via an electrical machine are illustrated in FIGS. 4 and 5.

A motor, such as an internal combustion engine, may be used to drive a main load and one or more ancillary loads applied by ancillary devices, for example water pumps, power steering pumps, vacuum pumps, oil pumps, compressors and alternators. These ancillary devices may be driven from the crankshaft of the motor such that the rotational speed of the ancillary device is directly proportional to the motor speed. These ancillary devices therefore have a predetermined gearing in order to fulfill the maximum load criteria for a given motor speed. Consequently, ancillary devices are frequently driven faster than required, which results in a reduced fuel economy for the motor and/or reduced motor performance.

To avoid these losses, the ancillary devices may be driven at a speed appropriate to the operating conditions of the motor. For instance, the alternator may be driven at a lower speed when the load on the motor's starter battery system is low or at a higher speed when the load is high. In a similar manner, the requirements of a coolant system of the motor may change depending on how the motor is being operated or on ambient conditions. It may be desirable therefore to drive the ancillary devices such that they run at an appropriate capacity for the operational requirements of the motor.

One previous approach to drive the ancillary devices may be to use one or more independent electric motors to drive the ancillary devices of a main drive motor at variable speeds such that the ancillary devices may operate at a speed appropriate to their operational requirements. However, in some cases, the power required to drive the ancillary devices from electric motors may result in even greater losses due to the generation, the storage and the motor cycle of the independent electric motors. By comparison, a direct mechanical drive may be more efficient.

Another alternative approach of driving the ancillary device at variable speeds may be to use a variable speed drive, such as a gearbox, that is driven mechanically by the output shaft of the main drive motor and is coupled to the ancillary device. However, there may be inherent problems with providing ancillary gearboxes on the motor, such as restricted packaging requirements, increased complexity, reduced overall reliability and associated costs. Furthermore, standard gearboxes may only provide discrete gear ratios and are therefore unable to provide a fully variable speed drive to the ancillary devices.

According to a first aspect of the present application there may be provided an electrical machine, such as a vehicle electrical machine, for driving one or more ancillary devices on a motor, for example a main drive motor of a vehicle. The electrical machine may comprise a stator configured to be rotated. The electrical machine may further comprise a rotor rotatably mounted relative to the stator. The rotational speed of the rotor of the electrical machine may depend upon a supply current to the electrical machine and a rotational speed of the stator.

In one example, the stator and the rotor may be mounted on bearings in a housing of the electrical machine. The housing, in one example, may be fixable to a portion of the motor and/or the vehicle. The housing, in other examples, may be fixable to the motor of the vehicle, a subframe of the vehicle or any other appropriate portion of the vehicle. The housing may at least partially form a portion of the ancillary device, a portion of the motor and/or a portion of the vehicle.

The stator may be coupled, e.g. rotatably coupled, to an output shaft of the motor. The stator may be driven by an accessory drive belt, a geared coupling or any other appropriate means such as direct connection to an output shaft of the motor. The stator may at least partially form an output member of the output shaft of the motor. The stator may be continuously rotated.

The rotor may be coupled, e.g. rotatably coupled, to the ancillary device of the motor. The rotor may at least partially form a drive member of the ancillary device. The rotor may extend through a housing of the motor for the purpose of driving one or more devices internal to the motor, for example a water pump, an oil pump and/or an alternator. The rotor may be disposed within the housing of the motor for the purpose of driving one or more devices internal to the motor, for example the water pump, the oil pump and/or the alternator. The rotor may comprise at least a portion of the device internal to the motor. For example, the rotor may comprise a rotor of the water pump and/or the oil pump. The rotor may comprise vanes configured to work a fluid, for example water or oil.

The rotational speed of the rotor may depend upon a supply current to the electrical machine. The rotational speed of the rotor may further depend upon the rotational speed of the stator.

In one example, the rotational speed of the rotor may depend upon a frequency of an alternating current supply to the electrical machine and the rotational speed of the stator. The frequency of the alternating current supply may be adjusted according to the requirements, for example the speed requirements, of the ancillary device and/or the motor.

In another example, the rotational speed of the rotor may be synchronized to the rotational speed of the stator upon providing a direct current supply to the electrical machine.

The rotor and the stator may be configured to rotate about the same axis. In one example, the rotor and the stator may be configured to rotate in the same direction. In another example, the rotor and the stator may be configured to rotate in opposite directions with respect to each other. The electrical machine may function as a generator when the rotational speed of the stator is greater than the frequency of the supply current to the electrical machine. In this manner, power will be generated by the electrical machine.

The electrical machine may further comprise a control device configured to adjust the supply current and/or voltage to the electrical machine depending upon the requirements of the ancillary device and/or the motor. For example, the control device may be configured to adjust the frequency of the supply current and/or the voltage.

The electrical machine may be configured such that the stator comprises one or more electrical windings and the rotor comprises one or more permanent magnets. The electrical machine may be configured such that the stator comprises the permanent magnet and the rotor comprises the one or more electrical windings. The stator and the rotor of the electrical machine may be configured in a similar manner to a variable speed electric motor, for example the rotor and the stator may each comprise one or more electrical windings. In another example, the rotor may comprise one or more electrical windings and the stator may comprise an induction cage. In yet another example, the stator may comprise one or more electrical windings and the rotor may comprise an induction cage.

The electrical machine may further comprise one or more electrical connectors configured to connect electrically the rotating stator and/or the rotating rotor to an electrical termination of the electrical machine. For example, the electrical connector may connect the electrical termination to the rotor and/or the stator, thereby transferring electrical signals and/or electrical power between the rotating components of the electrical machine and the stationary components of the electrical machine. The electrical connector may comprise a slip ring or any other appropriate electrical connector.

The electrical machine may be at least partially disposed within the housing of the motor. The stator may be coupled, e.g. rotatably, to one or more components internal to the motor. The stator may be coupled to a rotatable shaft of the motor, for example by way of an internal chain, belt or gear set, or may be fixed to, or integral with, a rotatable shaft of the motor.

According to another aspect of the present application there is provided an electrical machine, such as a vehicle electrical machine, for driving one or more ancillary devices on a motor, for example a main drive motor of a vehicle. The electrical machine comprises a rotor configured to be rotated. The electrical machine further comprises a stator rotatably mounted relative to the rotor. The rotational speed of the stator of the electrical machine depends upon a supply current to the electrical machine and a rotational speed of the rotor.

The rotor and the stator may be mounted on bearings in a housing of the electrical machine. The housing may be fixed to a portion of the motor and/or the vehicle. The housing may be fixed to the motor of the vehicle, a subframe of the vehicle or any other appropriate portion of the vehicle. The housing may at least partially form a portion of the ancillary device, a portion of the motor and/or a portion of the vehicle.

The rotor may be coupled, e.g. rotatably coupled, to an output shaft of the motor of the vehicle. The rotor may be driven by an accessory drive belt, a geared coupling or any other appropriate means such as direct connection to an output shaft of the motor. The rotor may at least partially form an output member of the output shaft of the motor. The rotor may be continuously rotated.

The stator may be coupled, e.g. rotatably coupled, to the ancillary device of the motor. The stator may at least partially form a drive member of the ancillary device. The stator may extend through a housing of the motor. The stator may be disposed within the housing of the motor for the purpose of driving one or more devices internal to the motor, for example a water pump, an oil pump and/or an alternator. The stator may comprise at least a portion of the device internal to the motor. For example, the stator may comprise a rotor of the water pump and/or the oil pump. The stator may comprise vanes configured to work a fluid, for example water or oil.

The rotational speed of the stator may depend upon a frequency of an alternating current supply to the electrical machine and the rotational speed of the rotor. The frequency of the alternating current supply may be adjusted according to the requirements, for example the speed requirements, of the ancillary device and/or the motor.

The rotational speed of the stator may be synchronized to the rotational speed of the rotor upon providing a direct current supply to the electrical machine.

The stator and the rotor may be configured to rotate about the same axis. The stator and the rotor may be configured to rotate in the same direction and/or in opposite directions with respect to each other. The electrical machine may function as a generator when the rotational speed of the rotor is greater than the frequency of the supply current to the electrical machine. In this manner, power will be generated by the electrical machine.

The electrical machine may further comprise a control device configured to adjust the supply current and/or voltage to the electrical machine depending upon the requirements of the ancillary device and/or the motor. For example, the control device may be configured to adjust the frequency of the supply current and/or the voltage.

The electrical machine may be configured such that the rotor comprises one or more electrical windings and the stator comprises one or more permanent magnets. The electrical machine may be configured such that the rotor comprises the permanent magnet and the stator comprises the one or more electrical windings. The rotor and the stator of the electrical machine may be configured in a similar manner to a variable speed electric motor, for example the stator and the rotor may each comprise one or more electrical windings. In another example, the stator may comprise one or more electrical windings and the rotor may comprise an induction cage. In another example, the rotor may comprise one or more electrical windings and the stator may comprise an induction cage.

The electrical machine may further comprise one or more electrical connectors configured to connect electrically the rotating rotor and/or the rotating stator to an electrical termination of the electrical machine. For example, the electrical connector may connect the electrical termination to the stator and/or the rotor, thereby transferring electrical signals and/or electrical power between the rotating components of the electrical machine and the stationary components of the electrical machine. The electrical connector may comprise a slip ring or any other appropriate electrical connector.

The electrical machine may be at least partially disposed within the housing of the motor. The rotor may be coupled, e.g. rotatably, to one or more components internal to the motor. The rotor may be coupled to a rotatable shaft of the motor, for example by way of an internal chain, belt or gear set, or may be fixed to, or integral with, a rotatable shaft of the motor. A vehicle may comprise the motor and/or one or more electrical machines according to the present application. In one example, each electrical machine may be connected to a different ancillary device.

The vehicle may further comprise the control device configured to adjust the supply current and/or voltage to the one or more electrical machines depending upon the requirements of the one or more ancillary devices and/or the motor.

According to another aspect of the present application, there may be provided a method of regulating the rotational speed of a rotor of an electrical machine for driving one or more ancillary devices of a motor. The method comprises: rotating a stator of the electrical machine; and adjusting a supply current and/or voltage to the electrical machine to achieve a desired rotational speed of the rotor.

The method may further comprise: controlling the supply current to the electrical machine using a control device. The control device may be configured to adjust the supply current to the electrical machine depending upon the requirements of the one or more ancillary devices and/or the motor.

The application may further provide software, such as a computer program or a computer program product for carrying out any of the method described herein, and a computer readable medium having stored thereon a program for carrying out any of the methods described herein. A computer program embodying the application may be stored on a computer-readable medium, or it could, for example, be in the form of a signal such as a downloadable data signal provided from an Internet website, or it could be in any other form.

Figure 1:
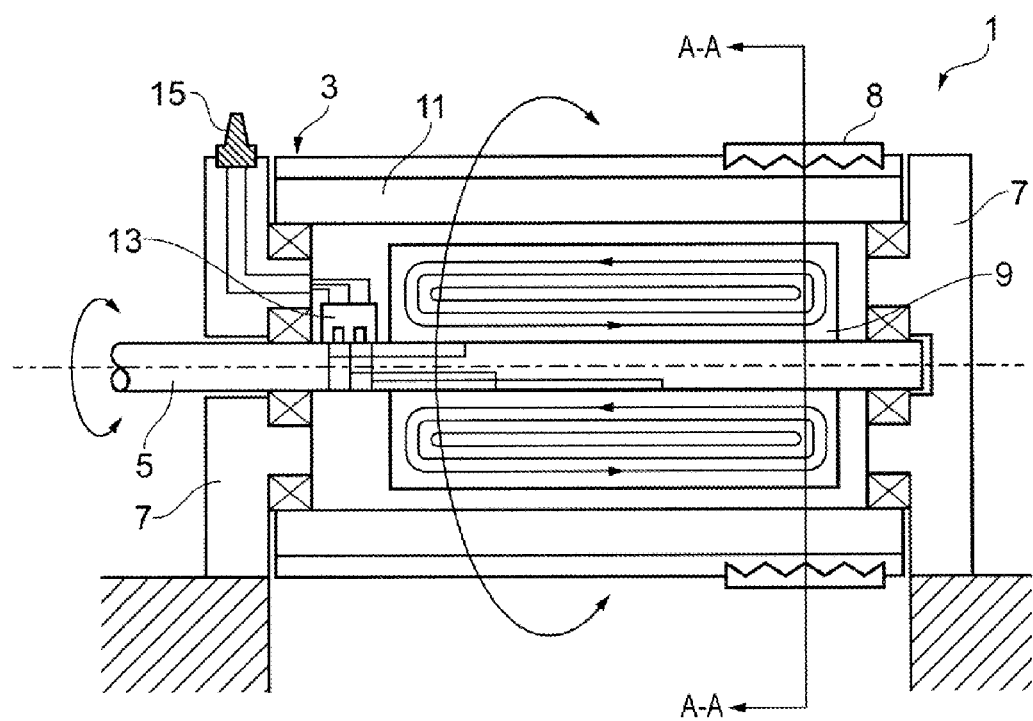
FIG. 1 shows an axial cross section through an electrical machine for driving one or more ancillary devices on a vehicle.
Figure 3:
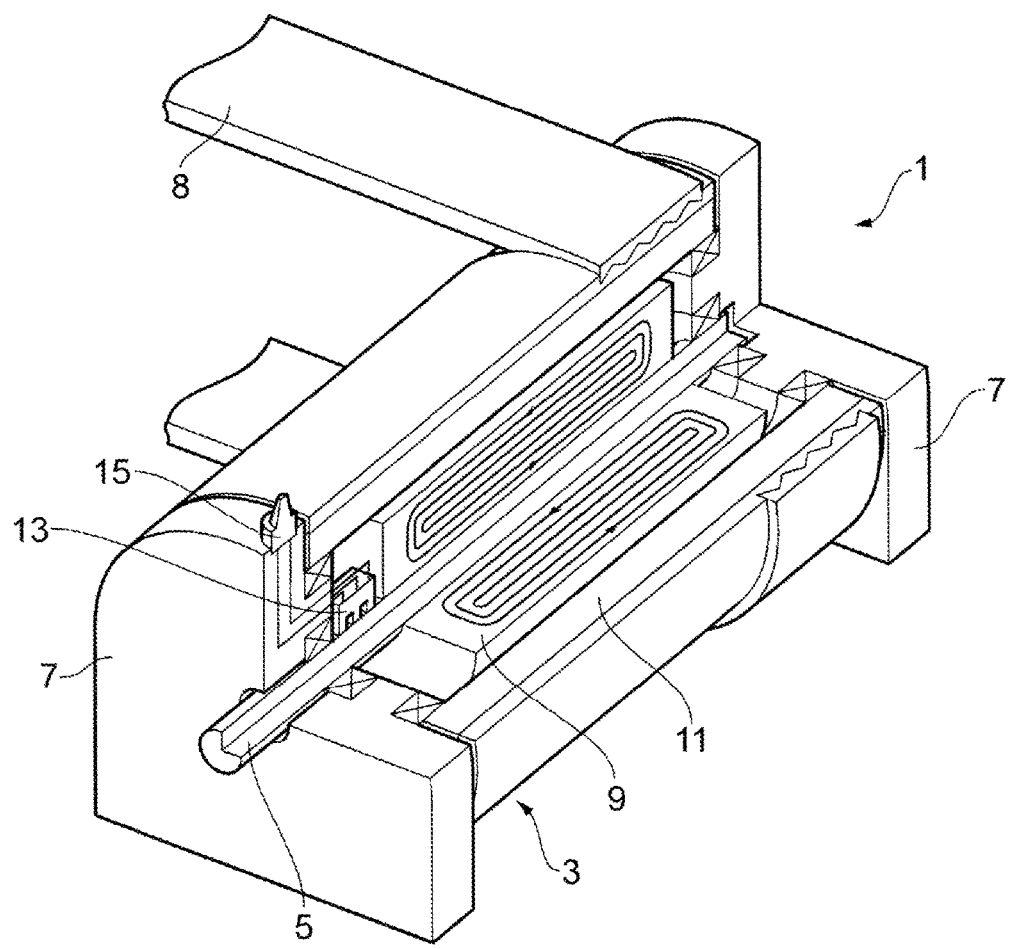
FIG. 3 shows a perspective view of the electrical machine for driving one or more ancillary devices on a vehicle.

Turning to FIGS. 1 to 3, an electrical machine 1 for driving one or more ancillary devices on a vehicle is shown.

The electrical machine 1 comprises a stator 3 configured to be rotated. The electrical machine 1 further comprises a rotor 5 rotatably mounted relative to the stator 3, wherein the rotational speed of the rotor 5 of the electrical machine 1 depends upon a supply current to the electrical machine 1 and the rotational speed of the stator 3.

In one example, one or more of the electrical machines 1 according to the present application may be installed on the vehicle for the purpose of driving ancillary devices such as water pumps, alternators or compressors, amongst others. It may be appreciated, however, that in alternative embodiments, the electrical machine 1 may be used to drive one or more ancillary devices on systems comprising a motor. In another example, the electrical machine 1 may be used to drive one or more ancillary devices on an electric generator system.

In the example shown in FIGS. 1 to 3, the stator 3 and the rotor 5 are supported on bearings mounted in a housing 7. The housing 7 may be fixed, for example, to a motor of the vehicle, a subframe of the vehicle or any other appropriate mounting point of the vehicle such that the housing may not rotate. The rotor 5 is mounted concentrically relative to the stator 3 such that the stator 3 and the rotor 5 are able to rotate about a common axis.

The stator 3 of the electrical machine 1 may be coupled to an output shaft of the motor of the vehicle. The output shaft may be configured to drive the stator 3 by way of a coupling such that the rotational speed of the stator 3 is proportional to the rotational speed of the output shaft. In the example shown in FIGS. 1 to 3, the stator 3 is rotatably driven by an accessory drive belt 8 that is coupled to the output shaft of the motor. The stator 3 may however be driven by a geared coupling, a viscous coupling, a magnetic coupling or any other appropriate type of coupling.

The rotor 5 of the electrical machine 1 may be configured to drive the ancillary device. The rotor 5 may be directly coupled to the ancillary device, for example, the rotor 5 of the electrical machine 1 may at least partially form a drive shaft of the ancillary device. Alternatively, rotor 5 of the electrical machine 1 may be coupled to the ancillary device by way of a geared coupling, a viscous coupling, a magnetic coupling or any other appropriate type of coupling.

The electrical machine 1 may be configured to operate as an electric motor, e.g. a synchronous electric motor, an asynchronous electric motor or any type of electric motor where speed control is achievable. The electric machine 1 may be configured such that the rotor 5 comprises one or more electrical windings 9 and the stator 3 comprises one or more permanent magnets 11. Alternatively, the stator 3 may comprise one or more electrical windings 9 and the stator 3 comprises one or more permanent magnets 11. The windings may be 3-phase windings in either a delta-configuration or Y-configuration and may be supplied with an alternating current (AC) supply current of variable frequency.

In the example shown in FIGS. 1 to 3, the electrical machine 1 comprises a synchronous electric motor, wherein the stator 3 comprises a two-pole permanent magnet 11 and the rotor 5 comprises three electrical windings 9. The stator 3 and rotor 5 may however comprise any appropriate number of electrical windings 9 and permanent magnets 11.

For a normal synchronous motor, the frequency of the AC supply current will determine the rotational speed of the rotor 5 in a manner such that the rotational speed of the rotor 5 is proportional to the frequency of the AC supply current. The frequency of the AC supply current may be selected in accordance with the desired rotational speed of the rotor 5. Furthermore, where the rotor is coupled to the ancillary device, the frequency of the AC supply current may be varied in accordance with the requirements of the ancillary device. Alternatively, the electrical machine may be supplied with a direct current (DC) supply current.

The electrical machine 1 may comprise multiple sets of permanent magnets 11 in the stator so that the ratio of the supply current frequency to the rotational speed of the rotor 5 may be selected in accordance with the desired application.

In the example shown in FIGS. 1 to 3, the electrical windings 9 are fixed to the rotor 5 and as such the electrical windings 9 rotate with the rotor 5. The electrical machine 1 comprises an electrical connector 13 that is configured to connect electrically the electrical windings 9 of the rotor 5 to an electrical termination 15 of the electrical machine 1. The electrical connector 13 may be a slip-ring type electrical connector or may be any other type of appropriate connector that allows the transfer of transmission of electrical power and/or electrical signals from a stationary portion of the electrical machine 1 to a rotating portion of the electrical machine 1.

The configuration of the electrical machine 1 according to the present application is such that the rotational speed of the rotor 5 is a function of the rotational speed of the stator 3, which is driven mechanically from the output shaft of the motor, and the frequency of the supply current, which is supplied to the electrical windings 11 of the rotor 5 for the purpose of rotating the rotor 5 relative to the stator 3. The present application may therefore be used to regulate the rotational speed of the rotor 5 relative to the rotational speed of the output shaft of the motor by adjusting the frequency of the current supplied to the electrical machine 1 according to the requirements of the ancillary device and/or the motor of the vehicle. In this manner, the electrical machine 1 may drive one or more ancillary devices at an appropriate speed for the given operating conditions.

The electrical machine may further comprise a control device configured to adjust the supply current to the electrical machine depending upon the requirements of the ancillary device and/or the motor of the vehicle. For example, the electrical machine 1 may be configured to drive a boost device, such as supercharger, of the vehicle. The control device may be configured to determine if the supercharger is operating above a required boost pressure and adjust the supply current to the supercharger accordingly. Additionally and/or alternatively, the vehicle may comprise one or more control devices, wherein the control devices of the vehicle are at least partially configured to adjust to the supply current to one or more of the electrical machines 1.

The present application provides a method of regulating the rotational speed of the rotor 5 of the electrical machine 1 for driving one or more ancillary devices on the vehicle. The method comprises rotating the stator 3 of the electrical machine 1 and adjusting the supply current to the electrical machine 1 to achieve a desired rotational speed of the rotor 5. In this way, the rotational speed of the rotor may be selected for the purpose of driving one or more ancillary devices at an appropriate speed for the operational requirements.

The method may further comprise controlling the supply current to the electrical machine 1 using the control device as described above.

Turning to FIG. 4, an example method 400 illustrates controlling a variable speed electrical machine, for example as described in FIG. 1, to drive an ancillary load of at least one ancillary device. The method includes regulating the rotational speed of the rotor of the electrical machine to drive the ancillary device. In example method 400, the rotational speed of the rotor may be controlled by the rotational speed of the stator and a current supplied to the electrical machine. For example, the rotational speed of the rotor relative to the rotational speed of the stator may be controlled by adjusting the frequency of the current supplied to the electrical machine according to the load demand of the ancillary device. In this way, the electrical machine may drive the ancillary device via the rotor at an appropriate speed for the operating conditions.

At 402, the method may determine the ancillary device load demand. The ancillary device load demand may vary based on vehicle operating conditions. For example, the alternator may be driven at a low speed when the load on the motor's starter battery system is low. In another example, the coolant load demand may vary based on the ambient conditions as well as engine speed. Thus, the ancillary device load may vary based on the operating conditions of the vehicle, ambient conditions, etc.

At 404, the method may determine the desired rotational speed of the rotor. The desired rotational speed of the rotor may be based on the ancillary device load demand. In one example, the rotor of the electrical machine is coupled to the ancillary device, thus the rotational speed of the rotor may deliver the ancillary device load.

At 406, the method may determine the rotational speed of the stator of the electrical machine. For example, the stator may be mechanically coupled to the output shaft of the motor by an accessory drive belt and the rotational speed of the stator is therefore directly proportional to the rotational speed of the output shaft. In another example, the rotational speed of the stator may be controlled by a geared coupling, a viscous coupling, a magnetic coupling or any other appropriate type of coupling.

At 408, the method may determine the frequency of the supply current desired. The frequency of the supply current applied to the electrical machine may depend upon the ancillary device load demand as well as the rotational speed of the stator. For example, the desired rotational speed of the rotor may be a function of the rotational speed of the stator and the supply current to the electrical machine. Thus, the supply current may be determined based on the desired rotational speed of the rotor at 404 and the determined rotational speed of the stator at 406.

At 410, the method may regulate the rotational speed of the rotor. For example, the rotational speed of the rotor is a function of the determined rotational speed of the rotor at 406 and the determined supply current at 408. The rotational speed of the rotor may be regulated by rotating the stator via the output shaft a 412 and applying the desired supply current at 414. In this way, the ancillary device load may be met by regulating the rotational speed of the rotor of the electrical speed. Thus, the ancillary devices may be driven at a demanded speed and not faster than required. Method 400 may results in a fuel economy for the motor and/or improved motor performance as compared to belt drive ancillary devices which are bound to the engine speed.

Turning to FIG. 5, a method 500 is illustrated for selecting a mode of operation for controlling the electrical machine based on ancillary device load demand. The ancillary device may be coupled to the rotor. Thus, the rotational speed of the rotor drives the ancillary device. The rotational speed of the rotor may be regulated as a function of the rotational speed of the stator and the frequency of a supply current supplied to the electrical machine. The rotational speed may be continuously variable. For example, the rotational speed may be equal to the rotational speed of the stator, greater than the rotational speed of the stator, or lower than the rotational speed of the stator. Further, the electrical machine may be used when the engine is off and the stator is not rotating to rotate the rotor to drive an ancillary device.

At 502, the method may determine if operating an ancillary device is desired. If no at 502, the method may then end. If yes at 502, the method may proceed to 504.

At 504 the method may determine the desired rotational speed of the rotor. For example, the desired rotational speed of the rotor may depend on the ancillary device load demand.

At 506, the method may determine the rotational speed of the stator. For example, the stator may be driven by an accessory belt mechanically coupling the stator to the output shaft. Thus, the rotational speed of the stator is directly proportional to the output shaft speed.

At 508, the method may determine if the engine is on. If yes at 508, the method may proceed to 512. If no at 508, the method may proceed to 510.

At 510, the method may operate in a fourth mode. In a fourth mode as illustrated in FIG. 2D, the output shaft of the motor and the stator 3 are not rotating, for example when the motor of the vehicle is switched off. During such scenarios, the electrical machine may function as a standard synchronous motor and the three-phase AC supply current may be supplied to the electrical device for the purpose of driving the ancillary device. This fourth mode of operation may be especially useful when use of one or more ancillary devices is needed whilst the engine, or motor, is switched off. For example, it may be desirable to maintain the function of the water pump and/or an air conditioning compressor once the motor is switched off.

At 512, after determining the engine is on at 508, the method may determine if the desired rotational speed of the rotor is equal to the rotational speed of the stator. If yes at 512, the method may proceed to 514 and operate in a first mode.

At 514, the method in the first mode may synchronize the rotational speed of the rotor to the rotational speed of the stator by applying a DC current to the electrical machine. For example, the first mode may be used when the vehicle is stationary and the motor is idling. In one example, the output shaft of the motor is rotating at 10 Hz (600 rpm). The stator may be mechanically coupled to the output shaft of the motor by the accessory drive belt. The transmission ratio between the output shaft and the stator is 1:1. The stator, therefore, is also rotating at 10 Hz (600 rpm). It may be appreciated, however, that the rotational speed of the stator may be different from the rotational speed of the output shaft of the motor in other examples. With reference to FIG. 2A, if a DC supply current is supplied to winding A, so that winding A1 is a magnetic north and winding A2 a magnetic south, and no supply current is supplied to windings B and C, then the angular orientation of the rotor may be fixed relative to the stator. The rotor, therefore, rotates at the same rotational speed as the stator, i.e. 10 Hz (600 rpm). Thus, in this first mode, the motor of the vehicle provides the power to drive the ancillary device and the magnitude of the DC supply current is sufficient to fix the angular orientation of the rotor relative to the stator for a given resistive torque applied to the rotor due to the load of the ancillary device. In this way, the rotational speed of the rotor is synchronized to the rotational speed of the stator upon supplying a DC supply current to the electrical machine.

If no at 512, the desired rotational speed of the rotor is not equal to the rotational speed of the stator, the method may proceed to 512.

At 516, the method may determine if the desired rotational speed of the rotor is greater than the rotational speed of the stator. If yes at 516, the method may proceed to 518 and operate in a second mode.

At 518, the method in a second mode may regulate the rotational speed of the rotor as the sum of the rotational speed of the stator and the frequency of the supply current to the electrical windings of the electrical machine. For example, in a second mode, the output shaft of the motor and the stator are rotating at 10 Hz (600 rpm) as described above for the first mode. With reference to FIG. 2B, if a three-phase AC supply current with a frequency of 10 Hz (600 rpm) is supplied to the electrical windings, such that, at one instance in the electrical cycle, winding B1 is a magnetic north and winding B2 is a magnetic south, the respective induced magnetic fields in the electrical windings act to align the windings B1 and B2 with the respective poles of the permanent magnet. In this manner, as the three-phase AC supply current cycles around the electrical windings, the electrical windings are constantly aligning with permanent magnets, and the rotor rotates faster than the stator. In this second mode, the rotational speed of the rotor is a function of the rotational speed of the stator and the frequency of the AC supply current to the electrical windings. Thus, the rotational speed of the rotor is the sum of these two speeds, i.e. 20 Hz (1,200 rpm), wherein the motor of the vehicle provides half of the power required to drive the ancillary device, the electrical machine providing the other half. Therefore, the rotational speed of the rotor may be greater than the stator speed, which may be directly proportional to the engine speed, allowing for a high ancillary device load demand to be met.

If no at 516, the desired speed of the rotor is not greater than the speed of the stator, the method may proceed to 520 and operate in a third mode.

At 510, the method may operate in a third mode wherein the electrical machine is controlled to regulate the rotational speed of the rotor to be lower than the rotational speed of the stator. For example, in a third mode, the output shaft of the motor and the stator are rotating at 10 Hz (600 rpm) as described above. With reference to FIG. 2C, when a three-phase AC supply current with a frequency of −5 Hz (−300 rpm) is supplied to the electrical windings, the rotor rotates in the opposite direction to the stator. At one instance in the electrical cycle, winding C1 is a magnetic south and winding C2 is a magnetic north, and the respective induced magnetic fields in the electrical windings act to align the electrical windings with the respective poles of the permanent magnets. In this manner, as the three-phase AC supply current cycles around the electrical windings, the electrical windings are constantly aligning with permanent magnets in the opposite direction to that described in the second mode. In this third mode, the rotational speed of the rotor is a function of the rotational speed of the stator and the frequency of the AC supply current to the electrical windings. Thus, the rotational speed of the rotor is the sum of these two speeds, i.e. 5 Hz (300 rpm) in this example. The third mode regulates the rotor of the electrical machine to rotate slower than the stator. In the third mode of operation, the electrical machine may function as a generator and may be able to return otherwise wasted energy back to an electrical system of the vehicle.

As ancillary devices often operate above the required operating speed in order to fulfill the maximum load criteria at any given motor speed, the third example mode of operation may be a primary mode of operation, as it may be desirable to drive the ancillary devices such that they run at an appropriate capacity for the operational requirements of the vehicle, thereby maximising the motor performance and the overall fuel economy of the vehicle. For example, the third mode of operation may be of particular use in hybrid and electric vehicles, wherein the electrical machine may be used as a generator to charge the battery system of the vehicle.

Thus method 500 provides four example modes for regulating the rotational speed of a rotor of an electrical machine to provide a demanded load of an ancillary device.

In this way, an electrical machine for driving one or more ancillary devise of a motor is provided. The electrical machine may regulate the speed of the rotor to provide the load demand of the ancillary device. By providing an electrical machine to drive the ancillary device, the ancillary device may be drive at an appropriate speed as opposed to ancillary devices driven from the crankshaft at the same speed as the engine. Thus, the electrical machine may improve fuel economy and motor performance.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electrical machine for driving one or more ancillary devices of a motor, the electrical machine comprising:
   a stator configured to be rotated; and
   a rotor rotatably mounted relative to the stator, and wherein a rotational speed of the rotor of the electrical machine depends upon a supply current to the electrical machine and a rotational speed of the stator,
   wherein the stator is coupled to an output shaft of the motor.

2. The electrical machine according to claim 1, wherein the stator forms at least a portion of the output shaft of the motor.

3. The electrical machine according to claim 1, wherein the rotor is coupled to the ancillary device of the motor.

4. The electrical machine according to claim 1, wherein the rotor forms at least a portion of a drive member of the ancillary device.

5. The electrical machine according to claim 1, wherein the stator is driven by an accessory drive belt or a geared coupling.

6. The electrical machine according to claim 1, wherein the rotational speed of the rotor depends upon a frequency of an alternating current supply to the electrical machine and the rotational speed of the stator.

7. The electrical machine according to claim 6, wherein the frequency of the alternating current supply is adjusted according to requirements of the ancillary device and/or the motor.

8. The electrical machine according to claim 6, wherein the electrical machine functions as a generator when the rotational speed of the stator is greater than a frequency of the supply current to the electrical machine.

9. The electrical machine according to claim 1, wherein the rotational speed of the rotor is synchronized to the rotational speed of the stator upon providing a direct current supply to the electrical machine.

10. The electrical machine according to claim 1, wherein either, the stator comprises one or more electrical windings and the rotor comprises one or more permanent magnets, or, the stator comprises the one or more permanent magnets and the rotor comprises the one or more electrical windings.

11. The electrical machine according to claim 1, the electrical machine further comprising one or more electrical connectors configured to connect electrically the stator and/or the rotor to an electrical termination of the electrical machine.

12. The electrical machine according to claim 1, further comprising a housing fixable to a portion of the motor wherein the housing comprises at least a portion of the ancillary device and/or the portion of the motor.

13. The electrical machine according to claim 1, wherein the electrical machine is at least partially disposed within a housing of the motor of a vehicle and wherein the rotor extends through the housing of the motor.

14. The electrical machine according to claim 1, further comprising a control device configured to adjust the supply current to the electrical machine depending upon requirements of the ancillary device and/or the motor.

15. A method of regulating a rotational speed of a rotor of an electrical machine for driving one or more ancillary devices on a motor, the method comprising:
    operating in a first mode wherein the rotational speed of the rotor is regulated to be equal to a rotational speed of a stator;
    operating in a second mode wherein the rotational speed of the rotor is regulated to be greater than the rotational speed of the stator; and
    operating in a third mode wherein the rotational speed of the rotor is regulated to be lower than the rotational speed of the stator.

16. The method of claim 15, further comprising regulating the rotational speed of the rotor wherein the rotational speed of the rotor of the electrical machine depends upon a supply current to the electrical machine and the rotational speed of the stator.

17. The method of claim 15, further comprising operating in a fourth mode when a vehicle engine is off wherein the rotational speed of the rotor is regulated by a supply current to the electrical machine.

18. An electrical machine for driving one or more ancillary devices of a motor, the electrical machine comprising:
    a stator configured to be rotated; and
    a rotor rotatably mounted relative to the stator, and wherein a rotational speed of the rotor of the electrical machine depends upon a supply current to the electrical machine and a rotational speed of the stator,
    wherein the rotor is coupled to the ancillary device of the motor.

* * * * *